COLOR TELEVISION CAMERA

Filed June 27, 1947 2 Sheets-Sheet 1

INVENTORS
GEORGE C. SZIKLAI
& ALFRED C. SCHROEDER
BY Samuel B. Smith
ATTORNEY

May 8, 1951 G. C. SZIKLAI ET AL 2,552,386

COLOR TELEVISION CAMERA

Filed June 27, 1947 2 Sheets-Sheet 2

INVENTORS
GEORGE C. SZIKLAI
& ALFRED C. SCHROEDER
BY Samuel B. Smith
ATTORNEY

Patented May 8, 1951

2,552,386

UNITED STATES PATENT OFFICE 2,552,386

COLOR TELEVISION CAMERA

George C. Sziklai, Princeton, N. J., and Alfred C. Schroeder, Feasterville, Pa., assignors to Radio Corporation of America, a corporation of Delaware Application June 27, 1947, Serial No. 757,504

14 Claims. (Cl. 178—5.4)

Figures 1, 2:
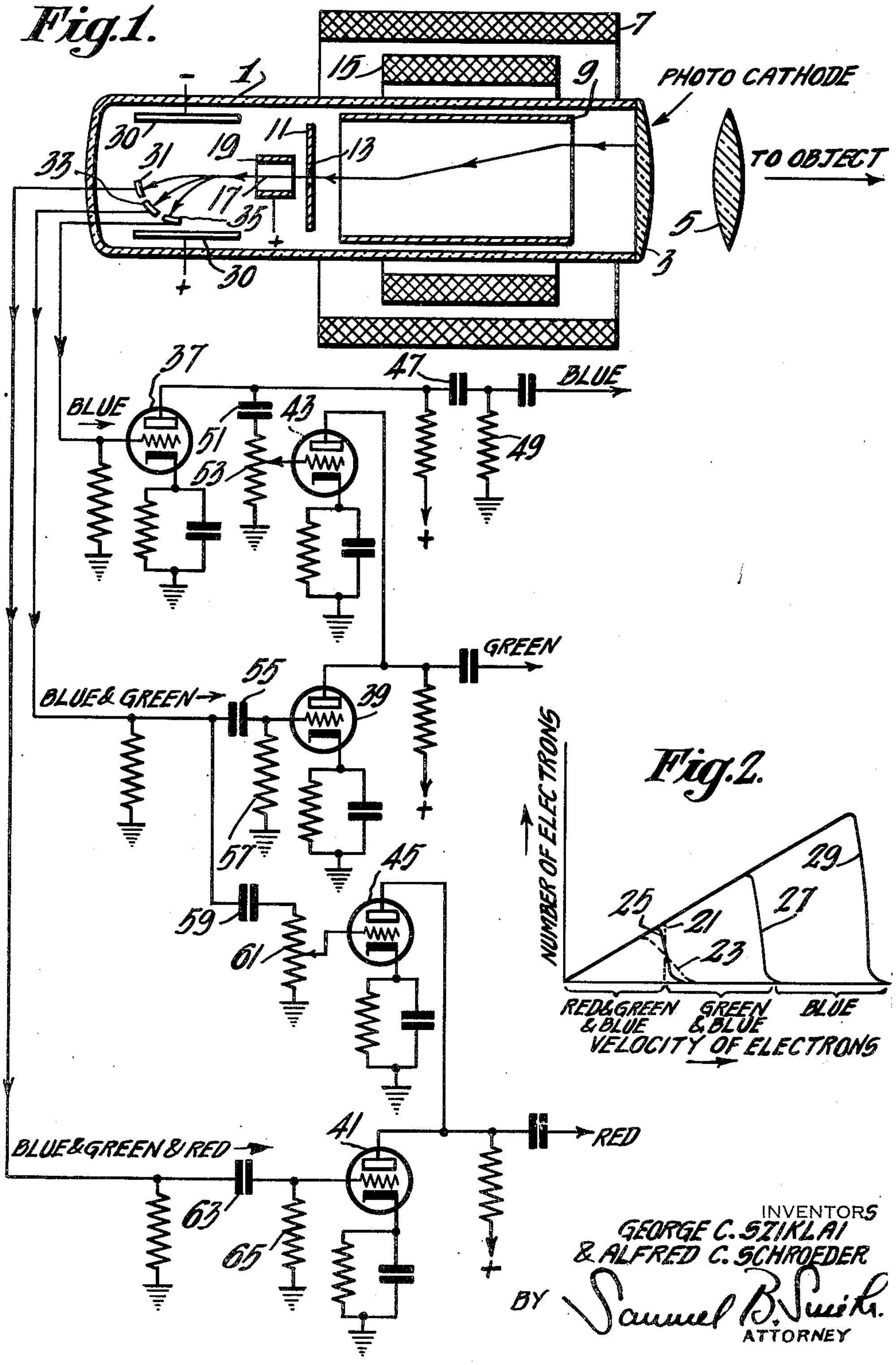

This invention relates to television image pickup devices and more particularly to a color television camera for the simultaneous type color system.

It is well known that the transmission of images by electricity can be accomplished by analyzing the image into its image elements and deriving therefrom a signal train of impulses by a predetermined orderly sequence of scanning. The image may then be reproduced at a remote location by its reconstruction in the same sequence of scanning.

It is also well known to the optical art that the reproduction of images in color may be accomplished by additive methods, that is, by breaking down the light from an object into a predetermined number of selected primary or component colors, which are three in number for a tricolor system, or, for a low degree of fidelity of color representation, even a bicolor system might be employed.

Color images may therefore be transmitted by electricity by analyzing the light from the object into not only its image elements, but by also analyzing the light from the object into selected primary or component colors and deriving therefrom a signal train of impulses representative of each of the selected component colors. A color image may then be reproduced at a remote position by appropriate reconstruction from the component color signal trains.

The transmission and reproduction of color images may be accomplished by either of two fundamental systems of multiple image transmission which have become widely known as the sequential and the simultaneous systems of color image transmission.

The sequential system transmits at any one time only one component color signal train and transmits the selected component color signal trains in predetermined sequence with other selected component color signal trains and preferably at a rapidly recurring rate.

The simultaneous system transmits all component color signal trains simultaneously through three separate signal channels.

The device employed for converting light from an object into a signal train is commonly known as a television camera. In the transmission of images by the sequential system, the camera may have a single image pickup tube such as, for example, the so-called image orthicon, which is exposed in succession to images giving color separation corresponding to the various selected component colors. During the period that the camera tube is exposed to each color component image, the mosaic is concurrently scanned in any well-understood manner to enable the transmission of signals representing the corresponding color separation image.

In the conventional sequential multicolor television receiver, a kinescope or other image producing tube is employed to recreate a black and white image likeness which is viewed or projected through a color filter of the selected component color corresponding to the desired component color instantaneously being represented. The process is then repeated for the next selected color component, and so on. A typical sequential color television system is shown and described in an article entitled "An experimental color television system" by R. D. Kell, G. L. Fredendall, A. C. Schroeder and R. C. Webb, beginning on page 141 of the "RCA Review" for June 1946.

A simultaneous all-electronic color television system including the television camera has been proposed involving a scanning cathode ray tube which forms a scanning raster to be projected on a color film from which selected component color light sensitive devices thansform the resultant light into several separate signal channels, each representative of a selected component color. A system of this nature is shown and described in an article entitled "Simultaneous all-electronic color television" beginning on page 459 of "RCA Review" for December 1946.

It will be seen, however, that the flying spot arrangement, which is very satisfactory for the conversion of color transparencies to appropriate signal trains, is not readily adaptable to studio pickup requirements where the object is three-dimensional, and particularly when illumination is required at the position of the object for reading and the like, or when the scene to be transmitted includes important light sources.

There has also been proposed the employment of a color camera utilizing three complete and independent camera tubes, each of which separates from the light of the object being scanned a separate selected component color image. Although satisfactory results can be obtained from such a system, disadvantages, including unusual bulk, expense and difficulties in registration, at once become apparent.

Such difficulties, and particularly registration problems, can be largely eliminated with the employment of a single camera tube. In order to utilize a single scanning raster for the development of the simultaneous type of color television systems, it is necessary to provide for the breakdown of light into its selected component colors by substantially simultaneous action of the scanning raster on the object or image thereof to obtain individual signal trains representative of each of the selected component colors.

In the co-pending U. S. application of G. C. Sziklai, Serial No. 751,808 filed June 2, 1947, there is shown and described a television camera employing a single camera tube which divides a color image of a scene being televized into a plurality of independent signal trains, each representative of a selected component color of the image. In the co-pending application of Sziklai referred to, the color separation is accomplished optically.

The U. S. patent of Alfred C. Schroeder, No. 2,446,249, shows and describes a camera tube which is capable of optically dividing a color image into a plurality of signal trains, each signal train representative of a selected component color portion of the image.

Both the inventions referred to above employ optical elements for color separation.

According to this invention, color separation is obtained electronically.

According to this invention, optical images are converted into a plurality of independent signal trains, each signal train representative of a selected component color portion of the optical image by the formation of an electron image of the optical image and deriving from the electron image an electron stream from each elemental area of the electron image in an orderly sequence of scanning. The electron stream is divided in accordance with the velocity of the individual electrons to give color separation. Independent signal trains representative of selected component colors may then be derived from each of the divided electron streams by balancing out all signals in each train except a single signal train representative of a single selected component color.

The primary object of this invention is to provide an improved television system.

Another object of this invention is to provide for improved simultaneous color image transformation into independent signal trains with a single image pickup tube.

Figure 3:
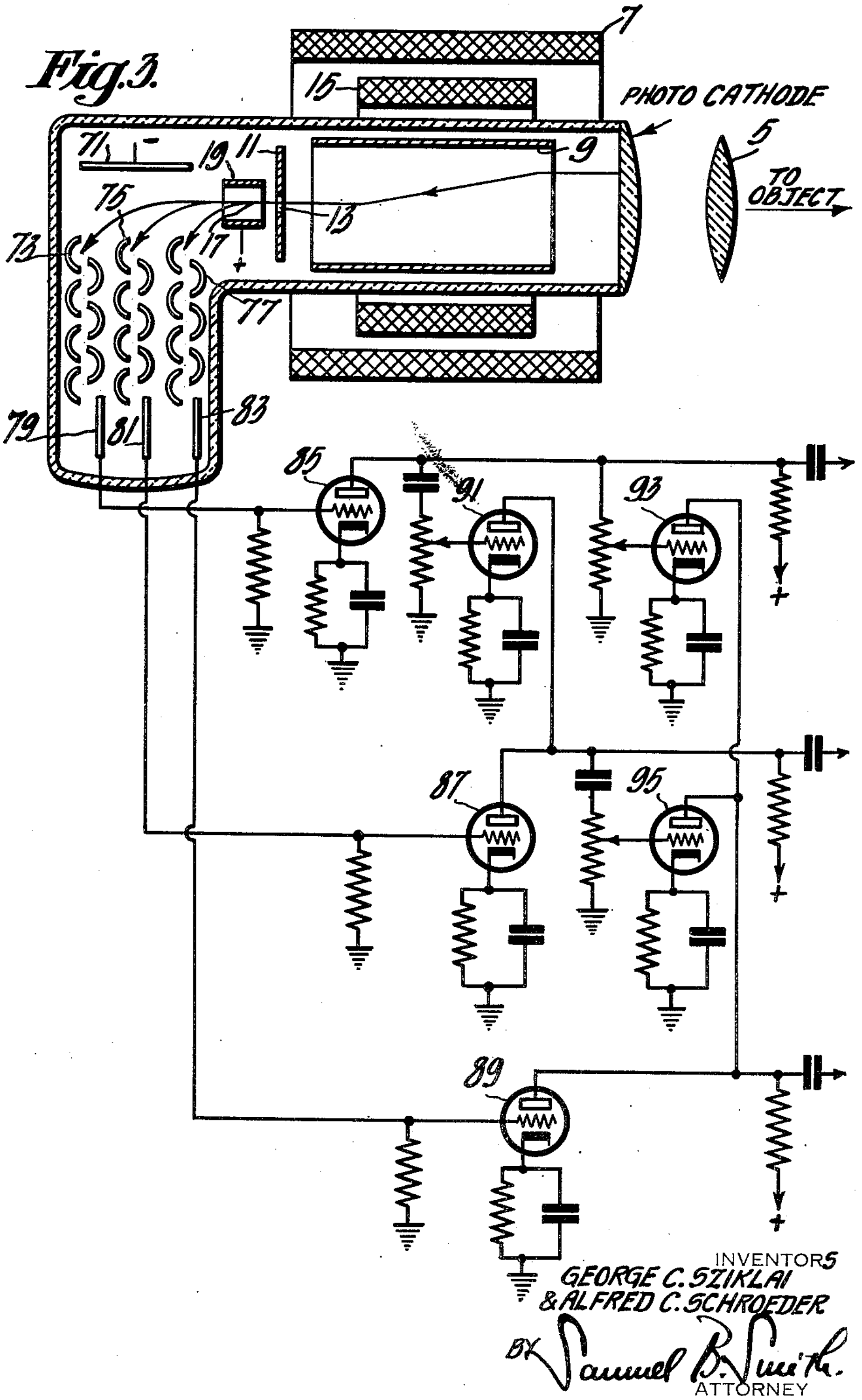

Other and incidental objects of the invention will be apparent to those skilled in the art from a reading of the following specification and an inspection of the accompanying drawing in which Figure 1 shows schematically one form of this invention;

Figure 2 illustrates graphically an electronic theory upon which the operation of this invention depends; and Figure 3 illustrates schematically another form of this invention.

Turning now in more detail to Figure 1, there is shown a tube 1 having a photo cathode 3. An optical lens 5 is so arranged to project an optical image of the object to be scanned on the photo cathode 3.

The photo cathode 3, as is known to the art, has a flat photosensitive surface so formed and characterized that the electron emission from any particular elemental area is dependent upon the amount of the incident light.

The theory of photoelectric emission is adequately described in the literature and needs no further detailed explanation here, except perhaps to refer to the book "Television" by V. K. Zworykin and G. A. Morton in which, beginning on page 22, the theory of photoelectric emission is outlined.

By reason of the optical image focused on the photo cathode 3, there will be formed adjacent the photo cathode 3 on the inside of the tube 1 an electron image representative of the optical image focused on the photo cathode 3.

The envelope of the tube 1 contains an electron lens which may, for example, take the form of an inductance coil 7. A cylindrical electrode 9 is charged positive with respect to the photo cathode 3 in order to attract the electrons away from the photo cathode 3 toward the plate 11. The lens 7 causes the electron image adjacent the photo cathode 3 to be focused on the plate 11. Plate 11 contains a small aperture 13.

It will be remembered that the current released from any elemental area of the photo cathode is proportional to the amount of the illumination on that particular elemental area. The electrons falling on plate 11, therefore, have a density distribution that corresponds with the light distribution of the optical image on the photo cathode 3.

By means of an electron deflecting field which may, for example, be obtained with coils 15, the flow of electrons from photo cathode 3 to plate 11 may be deflected as a whole as they are moving down the length of the tube 1 between the photo cathode 3 and the plate 11. The varying direction of emission between the electrons in the electron flow tends to scatter and distort the image as it moves, but this scattering and distorting of the electrode is counterbalanced by the forces supplied by the focusing arrangement consisting of the coil 7 and the cylindrical electrode 9. The electron image, therefore, arrives at the plate 11 in focus.

Electron deflecting systems are known to the art and may, for example, take the form of the system shown and described in the U. S. patent to W. A. Tolson, No. 2,101,520, dated December 7, 1937.

Any electrons arriving at the plate 11 at its aperture 13 will not be stopped when they reach the plate, but will continue therethrough to form an electron stream 17.

It follows that if a predetermined sequence of scanning is provided by the deflection coil 15, the electron stream 17 will effectively scan the electron image adjacent the photo cathode 3.

An appropriate electrode 19 is positioned adjacent the electron stream 17 and provided with a potential such as to slow the electrons to a velocity which is substantially equivalent to the initial velocity at which they left the photo cathode 3.

According to the Einstein law of photo emission, electrons leave a photoelectric surface with an initial kinetic energy whose maximum value is proportional to the frequency of the impinging radiation.

In Einstein's equation of photoelectric phenomena, the maximum initial kinetic energy of a photoelectron is a linear function of the frequency of the liberating radiation according to the relation of $$mv^2/2=hv-\phi$$

where $mv^2/2$ represents the kinetic energy, $h$ is Planck's constant, $v$ is the frequency of the radiation, and $\phi$ is the work function. The kinetic energy is also equal to the product of the electronic charge and the accelerating voltage $$eV=hv-\phi$$

where $e$ is the charge and V is the accelerating potential required to impart to an electron the velocity V when the electrons started in vacuum from rest. In the last equation, all the quantities except V and $v$ are constant; thus we may see that the potential at which the electron flow starts, or the threshold potential, is a direct function of the frequency of the radiation of a given surface.

This principle has been proposed for electronic spectroscopy. See the article entitled "Electronic spectroscopy" by applicants, beginning on page 763 of the "Journal of Applied Physics" for October 1946.

According to the Fermi-Dirak distribution of the energy among the conduction electrons, the number of electrons per unit energy is practically zero above a certain energy level which is lower than the work function of the metal.

In Figure 2, the dotted line 21 shows the distribution at 0° K. There is also shown by the dashed line 23 the distribution at 1500° K. where the rounding off approaching Maxwellian distribution is caused by thermionic effect. The solid line 25 is illustrated as a compromise which is representative of the energy distribution curve at room temperature and falls between the curves 21 and 23.

It follows that if this information is applied to the current in a photocell which is connected to a variable retarding potential, it is found that if certain wave length radiation is applied on the surface and the retarding potential is reduced to the threshold potential, current flow begins. When the retarding potential is reduced a greater amount, the current increases almost linearly until saturation occurs.

When light of assorted wave lengths is applied to a photoelectric surface, the total current obtained is a summation of the currents for the individual wave lengths, each of which currents has its threshold at a different potential, as indicated in Figure 2 by the thresholds 25, 27 and 29. It will be seen upon examination of the graph shown in Figure 2 that the portion of the curve up to the threshold 25 includes, for example, the red, green and blue color components. The area between thresholds 25 and 27 contains only the green and blue components, while the area included under the curve between thresholds 27 and 29 contains only the blue component.

The exactness of the indication is limited by the indefiniteness of the threshold values and non-linearity of the currents above the threshold potentials obtainable from available photoelectric surfaces. Lights of three component colors, such as red, green and blue, can be easily differentiated.

Returning now to Figure 1, it will be seen, therefore, that the electron stream 17 contains electrons traveling at various velocities. The velocities are dependent upon the wave length of the light incident upon the elemental area of the photo cathode 3 from which the electron stream 17 is obtained at that particular time.

It is well known that an electron subjected to a deflecting force at an angle to the direction which it is traveling will be deflected by an amount governed by not only the deflecting force but the velocity at which the electron is traveling.

There is provided a set of deflecting electrodes 39 which exert a deflecting force on the electron beam 17.

It therefore follows that those electrons in electron stream 17 which are traveling at a comparatively fast rate will be deflected only a small amount and will fall on electron collector 31. Those electrons of stream 17 which are traveling at a slower rate will fall upon collector electrode 33. The electrons which are traveling at a still slower rate will fall upon collector electrode 35.

Although the electrons which fall on the collector electrode 31 are representative of only the blue component of the elemental image area, it will be seen from an examination of the curve illustrated in Figure 2 that the electrons falling on collector electrode 33 will contain not only the electrons representative of the green component, but will also contain a quantity of electrons representative of the blue component. Likewise, the electrons intercepted by the collector 35 will contain not only the red component, but will include both the green and blue components.

It is therefore necessary, in order to provide signal trains representative of each of the selected component colors, that an arrangement be provided whereby a signal representative of the blue component be subtracted from the green channel, and likewise a signal representative of the green and blue component be subtracted from the red channel. This may be accomplished by connecting each of the collector electrodes 31, 33 and 35 to separate channels including amplifier tubes 37, 39 and 41, respectively.

The blue component can be cancelled out of the green channel by taking a portion of the blue channel signal and passing it through an inverter 43 and combining it with the blue and green signal in phase opposition.

Likewise, the blue and green component can be eliminated from the red channel by obtaining a portion of the blue and green components and passing them through inverter 45 to be combined with the blue, green and red component signal in phase opposition.

It will be seen from Figure 1, therefore, that three separate and distinct signal trains will be obtained from collector electrodes 31, 33 and 35. Each signal train is representative of a selected component color of the particular elemental area of the photo cathode 3 from which the electron stream 17 is obtained at that very moment.

The time delay in each of the channels must be equal. It is therefore proposed to insert in the blue channel a condenser and resistance combination including capacitor 47 and resistor 49, which will cause a delay equivalent to the delay in each of the other channels caused by the capacity resistance combination including capacity 51 and resistor 53, condenser 55 and resistor 57 insofar as the green channel is concerned, and capacitor 63 and resistor 65 included in the red component color signal channel.

The signal trains obtained from each of the red, blue and green signal channels illustrated may be utilized in any of the well known forms, such as, for example, in a simultaneous television system, as shown and described in the article entitled "Simultaneous all-electronic color television," beginning on page 459 of "RCA Review" for December 1946, or a sequential system of the type described in an article entitled "An experimental color television system" beginning on page 141 of "RCA Review" for June 1946.

Turning now to Figure 3, there is shown another form of this invention wherein, compared to the schematic diagram shown in Figure 1, like numbers refer to like elements.

The electron beam 17 is deflected by an electrode 71, to which is applied an appropriate potential sufficient to exert a deflecting force to the electron stream 17, which causes it to be intercepted by three separate groups of electrodes 73, 75 and 77, which constitute what is known as an electron multiplier.

The principle of operation is well known in the art and needs no further description here, except perhaps to say that the electrons received at each of the electrodes 73, 75 and 77 are multiplied by secondary emission as they pass down the series of interlaced electrodes until they reach the collector electrodes 79, 81 and 83.

The operation and description of a typical electron multiplier may be found in the article entitled "The electrostatic electron multiplier" by V. K. Zworykin and J. A. Rajchman, beginning on page 553 of the "Proceedings of the Institute of Radio Engineers" for September 1939.

Three separate signal channels are provided and each connected to a different collector electrode in such a manner that the channel employing tube 85 is connected to the collector electrode 79. The channel including tube 87 is connected to collector electrode 81, and the channel including tube 89 is connected to collector electrode 83.

It will be remembered that only the collector electrode 79 has a single selected component color signal, and the channels connected to collector electrodes 81 and 83 must have introduced a compensating signal to eliminate all but a single signal representative of a single selected component color.

In the form of the invention shown in Figure 3, this is accomplished in a slightly different manner than that form illustrated in Figure 1. A portion of the signal from the channel including tube 85 is combined out of phase with the signal contained in channel including tube 87 through tube 91.

The channel including the tube 89 obtains a correcting signal from the channel including tube 85 through the tube 93 and from the channel including tube 87 through tube 95.

Having thus described the invention, what is claimed is:

1. A method for converting optical images into a plurality of independent signal trains, each signal train representative of a selected component color portion of said optical images comprising the steps of producing an electron stream whose magnitude is dependent upon the selected elemental area brilliance of an optical image and whose electron velocity threshold is dependent upon the selected elemental area color characteristics, dividing said electron stream in accordance with the electron velocity thereof, converting each of the divided portions of the electron stream into representative separate signal trains and balancing out that portion of the signal obtained from any one divided portion of the electron stream which is equal to the signal obtained from the next adjacent divided portion of the stream having the next greater velocity.

2. A method for converting optical images into a plurality of signal trains, each signal train representative of a selected component color portion of said optical images comprising the steps of forming electron images of said optical images, deriving an electron stream from each elemental area of said electron images, dividing said electron stream in accordance with the electron velocity thereof, converting each of the divided portions of said electron stream into a separate signal train and balancing out that portion of the signal obtained from any one divided portion of said electron stream which is equal to the signal obtained from the next adjacent divided portion of the stream in the direction of the greater velocity of the electron stream.

3. A method for converting optical images into a plurality of signal trains, each signal train representative of a selected component color portion of said optical images comprising the steps of forming electron images of said optical images, deriving an electron stream from each elemental area of said electron images in a recurring sequential order, subjecting said electron stream to an electron deflecting field, dividing said electron stream in accordance with the amount of its deflection under the influence of said electron deflecting field, converting each of the divided portions of said electron stream into a separate signal train, and separating from each of said signal trains a single signal train representative of a different selected component color.

4. A method for converting an optical image into a plurality of signal trains, each signal train representative of a selected component color image of said optical images, comprising the steps of forming an electron image of said optical image, deriving an electron stream from each elemental area of said electron image in a recurring sequential order, subjecting said electron stream to an electron deflecting field, dividing said electron stream in accordance with the amount of its deflection under the influence of said electron deflecting field, converting each of the divided portions of said electron stream into a separate signal train, and separating from each of said signal trains a single signal train representative of a different selected component color image of said optical images.

5. A method for converting optical images into a plurality of signal trains, each signal train representative of a selected component color portion of said optical images comprising the steps of forming electron images of said optical images, deriving an electron stream from each elemental area of said electron images in a recurring sequential order, subjecting said electron stream to an electron deflecting field, dividing said electron stream in accordance with the amount of its deflection under the influence of said electron deflecting field, converting each of the divided portions of said electron stream into a separate signal train, intercepting said electron stream at a plurality of different positions, each position representative of different amounts of deflection of said electron stream, and removing from each of said separate signal trains the signals representative of all but one different selected component color.

6. A method for converting optical images into a plurality of signal trains, each signal train representative of a selected component color portion of said optical images, comprising the steps of forming electron images of said optical images, deriving an electron stream from each elemental area of said electron images in a recurring sequential order, subjecting said electron stream to an electron deflecting field, dividing said electron stream in accordance with the amount of its deflection under the influence of said electron deflecting field, converting each of the divided portions of said electron stream into a separate signal train, and cancelling out that portion of the signal obtained from any one divided portion of said electron stream which is equal to the signal obtained from the next adjacent divided portion in the direction of the lesser deflection of the electron beam.

7. A method for converting optical images into a plurality of signal trains, each signal train representative of a selected component color portion of said optical images, comprising the steps of forming electron images of said optical images, deriving an electron stream from each elemental area of said electron images in a recurring sequential order, subjecting said electron stream to an electron deflecting field, dividing said electron stream in accordance with the amount of its deflection under the influence of said electron deflecting field, converting each of the divided portions of said electron stream into a separate signal train, intercepting said electron stream at a plurality of different amounts of deflection, and removing from each of said separate signal trains the signal representative of all but one different selected component color.

8. A method for converting optical images into a plurality of signal trains, each signal train representative of a selected component color portion of said optical images comprising the steps of forming electron images of said optical images, deriving from said electron image an electron flow whose elemental area magnitude is dependent upon the corresponding elemental area brilliance of the impinging optical image and whose elemental area electron velocity is dependent upon the wave length of the light impinging upon the associated elemental area of the optical image, dividing said electron flow in accordance with the velocity of its electrons, converting each of the divided portions of said electron flow into separate signals and deriving from each of said signals a single signal train representative of a different selected range of velocities of the electrons in said electron flow.

9. A television camera comprising in combination a photo cathode means to project an electronic image on said photo cathode from an optical image, means for deriving from elemental areas of said electron image a stream of electrons having a magnitude dependent upon the corresponding elemental area illumination of said optical image, means to exert a transverse force on said stream of electrons a plurality of electron collectors positioned in the path of said electron stream and arranged to selectively intercept electrons from said electron stream in accordance with the effect of said transverse force on the electrons, a signal channel connected to each of said collectors, and means comprising neutralizing circuit connections between said channels to balance out from each of said channels the signals representative of all but a single different selected component color.

10. A television camera comprising in combination a photo cathode optical means to project an optical image on said photo cathode to form an electronic image from an optical image, means consisting of an electron scanning beam for deriving from said electron image a stream of electrons from elemental areas of said electron image in a predetermined scanning sequence, an electron deflecting element positioned adjacent said electron stream, a plurality of electron collectors positioned adjacent the path of the undeflected electron stream, a video signal channel connected to each of said collectors, and means comprising circuit connections between said channels to remove from each of said separate signal trains the signals representative of all but a single different selected component color.

11. A television camera comprising in combination a photo cathode to form an electronic image from an optical image, means for deriving from said electron image a stream of electrons from elemental areas of said electron image in a predetermined scanning sequence, means for exerting on said electron stream an electron deflecting force, a plurality of electron collectors positioned in the path of said deflected electron stream and arranged in order to selectively intercept electrons from said electron stream in accordance with the amount of the deflection of the electrons, a signal channel conected to each of said collectors, and means comprising circuit connections between said channels to impress on each of said signal channels a portion of the signal from the electrodes collecting the electrons deflected to a greater degree in opposite phase to the phase of the signal in the channel.

12. A television camera comprising in combination a photo cathode to form an electronic image from an optical image, means for deriving from said electron image a stream of electrons from elemental areas of said electron image in a predetermined scanning sequence, an electron deflecting element positioned in the path of said deflected electron stream and arranged in order to selectively intercept electrons from said electron stream in accordance with the amount of the deflection of the electrons, a signal channel connected to each of said collectors, and means comprising circuit conections between said channels to cancel out that portion of the signal obtained from any one electron collector equal to the signal obtained from the electron collector next adjacent in the direction of the lesser deflection of the electron beam.

13. A television image pickup device comprising in combination a photo cathode to form an electronic image from an optical image, means for deriving from said electron image a stream of electrons having a magnitude dependent upon the illumination of said optical image, a plurality of electron collectors positioned in the path of said electron stream and arranged to selectively intercept electrons from said electron stream in accordance with the velocity of the electrons, a signal channel connected to each of said collectors, and circuit connections between said channels to cancel out that portion of the signal contained in each of the channels obtained from any one divided portion of said electron stream which is equal to the signal obtained from the next adjacent divided portion in the direction of the increased velocity of the electron stream.

14. A television image pickup system comprising a color image pickup tube of the instantaneous scanning type and having a plurality of electron collectors positioned adjacent the path of the flowing electrons, means to deflect the flowing electrons against said collectors, a signal channel connected to each of said collectors and circuit connections between said channels to cancel out that portion of the signal which is equivalent to the signal in another channel obtained from the electron collector next adjacent in the direction of the increased velocity of the electrons.

GEORGE C. SZIKLAI.
ALFRED C. SCHROEDER.

REFERENCES CITED

The following references are of record in the file of this patent:

UNITED STATES PATENTS

| Number | Name | Date |
|---|---|---|
| 2,227,015 | Schlesinger | Dec. 31, 1940 |
| 2,353,086 | Murray | Aug. 19, 1941 |
| 2,284,829 | Ludi | June 2, 1942 |
| 2,294,820 | Wilson | Sept. 1, 1942 |
| 2,307,188 | Bedford | Jan. 5, 1943 |